US011700186B1

United States Patent
Mehra et al.

(10) Patent No.: US 11,700,186 B1
(45) Date of Patent: Jul. 11, 2023

(54) METHODS AND SYSTEMS FOR MANAGING A NETWORK DEPLOYED AT A CUSTOMER SITE

(71) Applicant: Nile Global, Inc., San Jose, CA (US)

(72) Inventors: Shiv Mehra, Saratoga, CA (US); Suresh Katukam, Milpitas, CA (US)

(73) Assignee: Nile Global, Inc., San Jose, CA (US)

( * ) Notice: Subject to any disclaimer, the term of this patent is extended or adjusted under 35 U.S.C. 154(b) by 0 days.

(21) Appl. No.: 17/824,734

(22) Filed: May 25, 2022

(51) Int. Cl.
*H04L 41/5009* (2022.01)
*H04L 41/50* (2022.01)
*H04W 88/08* (2009.01)

(52) U.S. Cl.
CPC ...... *H04L 41/5009* (2013.01); *H04L 41/5032* (2013.01); *H04W 88/08* (2013.01)

(58) Field of Classification Search
CPC . H04L 41/5009; H04L 41/5032; H04W 88/08
See application file for complete search history.

(56) References Cited

U.S. PATENT DOCUMENTS

| 9,426,724 | B2 | 8/2016 | Parron et al. | |
|---|---|---|---|---|
| 10,250,451 | B1 * | 4/2019 | Moghe | H04L 41/0896 |
| 10,572,650 | B2 | 2/2020 | Cooper et al. | |
| 10,855,555 | B2 * | 12/2020 | Paruchuri | H04L 45/24 |
| 2012/0224481 | A1 * | 9/2012 | Babiarz | H04L 47/2408 370/230.1 |
| 2015/0195149 | A1 * | 7/2015 | Vasseur | H04L 41/5009 370/252 |
| 2021/0067419 | A1 * | 3/2021 | Adam | H04L 41/0806 |
| 2021/0218642 | A1 * | 7/2021 | Pasupathy | H04L 47/2425 |

* cited by examiner

*Primary Examiner* — Joe Chacko
(74) *Attorney, Agent, or Firm* — Loza & Loza, LLP

(57) ABSTRACT

Embodiments of a device and method are disclosed. In an embodiment, a method for managing a network deployed at a customer site involves at a cloud server connected to the network, receiving wireless signal strength information that are detected by wireless sensors of wireless access points (APs) of the network deployed at the customer site; and at the cloud server, automatically disabling service-level agreement (SLA) scanning and probing of a first wireless sensor of a first wireless AP of the wireless APs when the wireless signal strength information indicates that wireless signal strength of each neighbor wireless AP of the first wireless AP is below a predefined threshold.

20 Claims, 8 Drawing Sheets

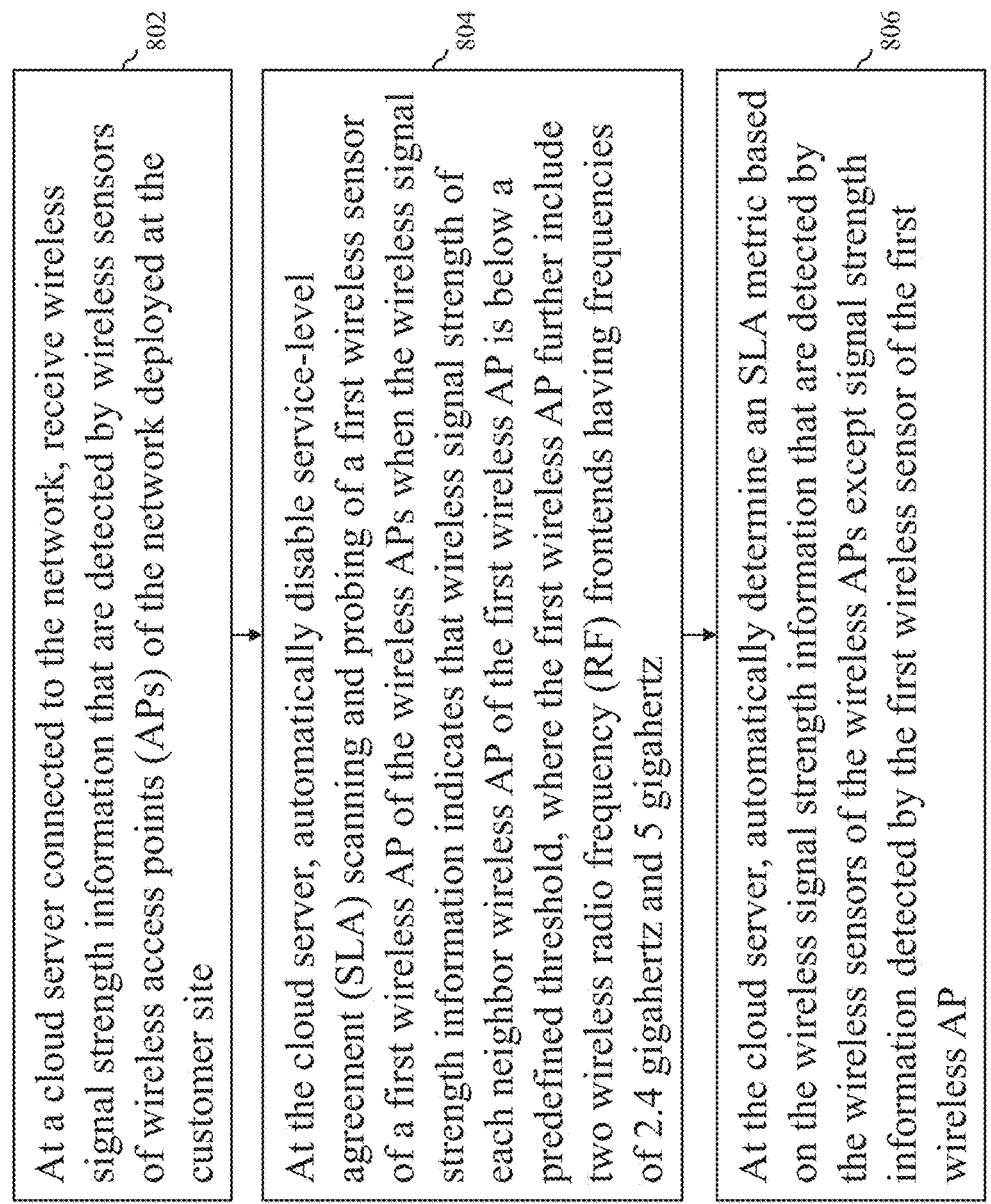

METHODS AND SYSTEMS FOR MANAGING A NETWORK DEPLOYED AT A CUSTOMER SITE

BACKGROUND

Growing adoption of networks, such as, enterprise campus networks allows enterprises to increase network coverage and functionality. For example, due to the dynamic nature of the business and campuses, switches, gateways, wireless access points (APs), and/or client devices, such as, laptops, printers, servers, security cameras, and/or other connected Internet of things (IoT) devices are typically interconnected in a network. Network management, for example, network availability management, network capacity management, and/or network coverage management plays an important role in ensuring that network designs and deployments meet agreed upon commitments. Typically, a service-level agreement (SLA) defines as a commitment between a service provider and a client. However, for a network with wireless capabilities (e.g., wireless local area network (WLAN) capabilities), it can be difficult to provide an SLA commitment due to varying channel conditions and/or interference. Therefore, there is a need for technology that can provide an SLA commitment for a network with wireless capabilities.

SUMMARY

Embodiments of a device and method are disclosed. In an embodiment, a method for managing a network deployed at a customer site involves at a cloud server connected to the network, receiving wireless signal strength information that are detected by wireless sensors of wireless access points (APs) of the network deployed at the customer site; and at the cloud server, automatically disabling service-level agreement (SLA) scanning and probing of a first wireless sensor of a first wireless AP of the wireless APs when the wireless signal strength information indicates that wireless signal strength of each neighbor wireless AP of the first wireless AP is below a predefined threshold. Other embodiments are also described.

In an embodiment, the method further includes at the cloud server, automatically determining an SLA metric based on the wireless signal strength information that are detected by the wireless sensors of the wireless APs except signal strength information detected by the first wireless sensor of the first wireless AP.

In an embodiment, the first wireless AP further includes two wireless radio frequency (RF) frontends having two different frequencies.

In an embodiment, the two wireless RF frontends are of 2.4 gigahertz and 5 gigahertz.

In an embodiment, the method further includes at the cloud server, automatically enabling SLA scanning and probing of the first wireless sensor of the first wireless AP of the wireless APs after SLA scanning and probing of the first wireless sensor is disabled.

In an embodiment, the wireless signal strength information that are detected by the wireless sensors of the wireless APs includes signal strength reports that are generated by the wireless APs.

In an embodiment, each of the signal strength reports that are generated by the wireless APs includes a neighbor wireless AP and a wireless signal strength value of the neighbor wireless AP.

In an embodiment, the cloud server is connected to the wireless APs through a distribution switch (DS) and an access switch (AS).

In an embodiment, the method further includes at the cloud server, generating an alert regarding the network deployed at the customer site when the SLA metric does not satisfy a predetermined SLA threshold.

In an embodiment, the SLA metric includes a percentage of time in which a predetermined network availability, coverage, or capacity is satisfied in a time unit, and at the cloud server, generating the alert regarding the network deployed at the customer site when the SLA metric does not satisfy the predetermined SLA threshold includes at the cloud server, generating the alert regarding the network deployed at the customer site when the percentage of time in which the predetermined network availability, coverage, or capacity is satisfied in the time unit is lower than the predetermined SLA threshold.

In an embodiment, a cloud server for managing a network deployed at a customer site includes memory and one or more processors configured to receive wireless signal strength information that are detected by wireless sensors of wireless access points (APs) of the network deployed at the customer site, and automatically disable service-level agreement (SLA) scanning and probing of a first wireless sensor of a first wireless AP of the wireless APs when the wireless signal strength information indicates that wireless signal strength of each neighbor wireless AP of the first wireless AP is below a predefined threshold.

In an embodiment, the one or more processors are further configured to automatically determine an SLA metric based on the wireless signal strength information that are detected by the wireless sensors of the wireless APs except signal strength information detected by the first wireless sensor of the first wireless AP.

In an embodiment, the first wireless AP further includes two wireless radio frequency (RF) frontends having two different frequencies.

In an embodiment, the two wireless RF frontends are of 2.4 gigahertz and 5 gigahertz.

In an embodiment, the one or more processors are further configured to automatically enable SLA scanning and probing of the first wireless sensor of the first wireless AP of the wireless APs after SLA scanning and probing of the first wireless sensor is disabled.

In an embodiment, the wireless signal strength information that are detected by the wireless sensors of the wireless APs includes signal strength reports that are generated by the wireless APs.

In an embodiment, each of the signal strength reports that are generated by the wireless APs includes a neighbor wireless AP and a wireless signal strength value of the neighbor wireless AP.

In an embodiment, the cloud server is connected to the wireless APs through a distribution switch (DS) and an access switch (AS).

In an embodiment, the one or more processors are further configured to generate an alert regarding the network deployed at the customer site when the SLA metric does not satisfy a predetermined SLA threshold.

In an embodiment, a method for managing a network deployed at a customer site includes at a cloud server connected to the network, receiving wireless signal strength information that are detected by wireless sensors of wireless access points (APs) of the network deployed at the customer site, at the cloud server, automatically disabling service-level agreement (SLA) scanning and probing of a first wireless sensor of a first wireless AP of the wireless APs when the wireless signal strength information indicates that wireless signal strength of each neighbor wireless AP of the first wireless AP is below a predefined threshold, where the first wireless AP further comprises two wireless radio frequency (RF) frontends having frequencies of 2.4 gigahertz and 5 gigahertz, and at the cloud server, automatically determining an SLA metric based on the wireless signal strength information that are detected by the wireless sensors of the wireless APs except signal strength information detected by the first wireless sensor of the first wireless AP.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 8 is a process flow diagram of a method for managing a network deployed at a customer site in accordance to an embodiment of the invention.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
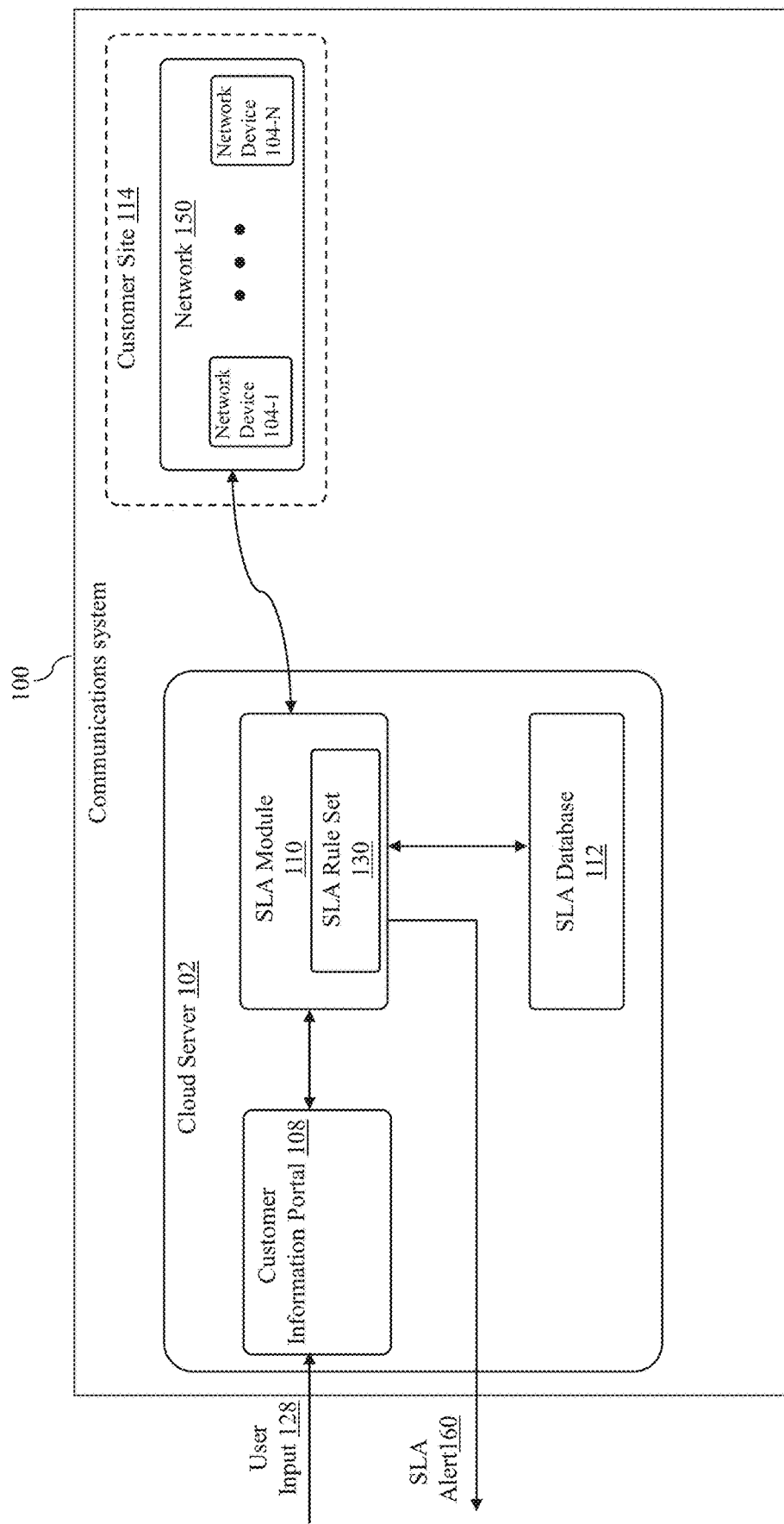
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102 and at least one deployed network 150 within a customer site 114. The cloud server and/or the deployed network may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, and/or more than one customer site. In another example, although the cloud server and the deployed network are shown in FIG. 1 as being connected in certain topology, the network topology of the communications system 100 is not limited to the topology shown in FIG. 1.

The cloud server 102 can be used to provide at least one service to a customer site (e.g., to the deployed network 150 located at the customer site 114). The cloud server may be configured to facilitate or perform a service-level agreement (SLA) service (e.g., a specific level of network availability, coverage and/or capacity) to network devices (e.g., the deployed network 150) at the customer site. Because the cloud server can facilitate or perform an SLA service to network devices at the customer site, network management efficiency can be improved. In addition, because the cloud server can facilitate or perform an SLA service to network devices at the customer site, a user or customer of the customer site can be notified of network outage. Consequently, network outage time can be reduced. In some embodiments, the cloud server is configured to generate a user interface to obtain input information, for example, a floor plan of a customer site. In some embodiments, the user interface includes a graphical user interface. The cloud server may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes an SLA module 110, a customer information portal 108 connected to the SLA module 110, and an SLA database 112 configured to store SLA data. The SLA module, the customer information portal, and/or the SLA database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality.

For example, in some embodiments, the cloud server includes more than one SLA module, more than one customer information portal, and/or more than one SLA database. In another example, although the SLA module, the customer information portal, and the SLA database are shown in FIG. 1 as being connected in certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server. In some embodiments, the SLA module 110 is configured to facilitate or perform an SLA service to network devices (e.g., the deployed network 150) at the customer site 114, for example, using an SLA rule set 130. The SLA rule set 130 may include one or more SLA rules for network devices at the customer site 114, for example, for performing an SLA service to network devices at the customer site 114. In some embodiments, the SLA module 110 is configured to generate and/or transmit at least one SLA alert 160 regarding a network deployed and/or to be deployed at the customer site, for example, to an administrator or a user or customer (e.g., a layperson such as a worker on-site or an end-user such as an employee) at the customer site 114. In some embodiments, the SLA database 112 is configured to store SLA data for a network deployed and/or to be deployed at the customer site (e.g., a list of network devices deployed or to be deployed at the customer site). For example, the SLA database 112 is configured to store SLA measurement data and/or a list of specific levels of network availability, coverage and/or capacity for network devices deployed at the customer site 114. In some embodiments, the SLA database 112 is configured to store the at least one SLA alert 160. Because the SLA module can facilitate or perform an SLA service to network devices at the customer site, network management efficiency can be improved. In addition, because the SLA deployment module can facilitate or perform an SLA service to network devices at the customer site, a user or customer (e.g., a layperson such as a worker on-site or an end-user such as an employee) at the customer site can be notified of network conditions or outrages. Consequently, network outage time can be shortened. The customer information portal 108 is configured to receive customer input 128. In some embodiments, the customer information portal is configured to include or generate a user interface that allows a customer to input information related to the customer site 114 (e.g., the floor plan of the customer site 114) and/or information associated with an SLA service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a digital signal processor (DSP), and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the network devices 104-1, . . . , 104-N is compatible with Institute of Electrical and Electronics Engineers (IEEE) 802.3 protocol and/or one or more wireless local area network (WLAN) communications protocols, such as an IEEE 802.11 protocol, and/or a short-range communications protocol, such as Bluetooth. In some embodiments, at least one of the network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the network devices 104-1, . . . , 104-N is a wireless station (STA) that wirelessly connects to a wireless AP. For example, at least one of the network devices 104-1, . . . , 104-N may be a laptop, a desktop personal computer (PC), a mobile phone, or other wireless device that supports at least one WLAN communications protocol (e.g., an IEEE 802.11 protocol).

Figure 2:
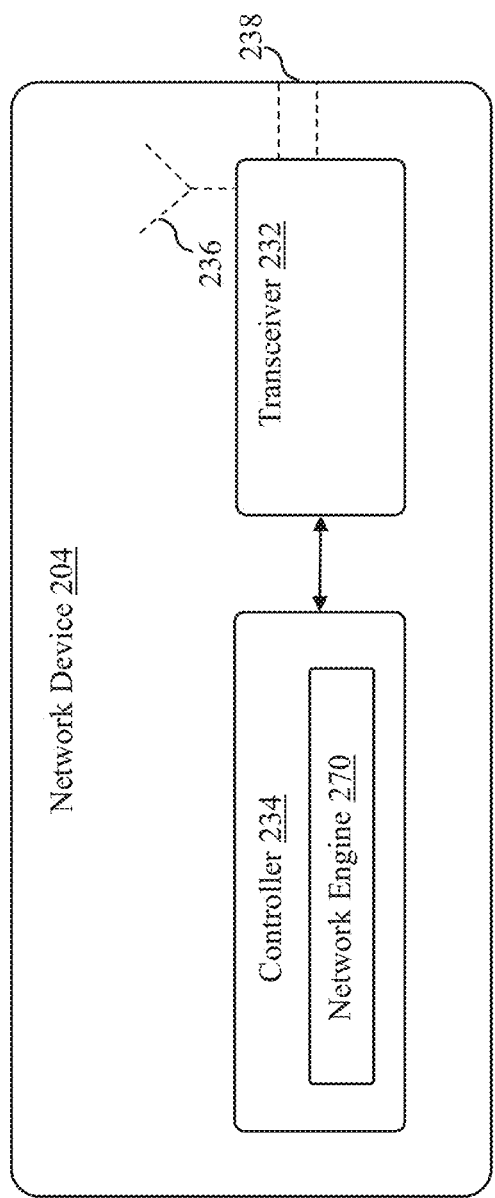
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device 104-1, . . . , or 104-N that is included in the deployed network 150 in FIG. 1. However, network devices that can be included in the deployed network 150 depicted in FIG. 1 are not limited to the embodiment depicted in FIG. 2. The network device 204 may be any suitable type of network device. For example, the network device 204 may be a distribution switch (DS), a gateway or headend (HE), an access switch (AS), a wireless access point (AP), a sensor, a laptop, a desktop personal computer (PC), or a mobile phone.

In the embodiment depicted in FIG. 2, the network device 204 includes at least one wireless and/or wired transceiver 232, at least one optional antenna 236 operably connected to the transceiver 232, at least one optional network port 238 operably connected to the transceiver 232, and a controller 234 operably connected to the transceiver 232. In some embodiments, the transceiver 232 includes a physical layer (PHY) device. The transceiver 232 may be any suitable type of transceiver. For example, the transceiver 232 may be an LAN transceiver (e.g., an Ethernet transceiver), a short-range communications transceiver (e.g., a Bluetooth or Bluetooth Low Energy (BLE) transceiver), or a WLAN transceiver (e.g., a transceiver compatible with an IEEE 802.11 protocol). In some embodiments, the network device 204 includes multiple transceivers, for example, an LAN transceiver (e.g., an Ethernet transceiver), a short-range communications transceiver (e.g., a Bluetooth or BLE transceiver), and/or a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store information relevant to the network device 204 (e.g., security information relevant to the network device 204, such as, security certificate information). For example, the controller 234 may be configured to obtain and/or store security information relevant to the network device 204 such as security certificate information. In some embodiments, the controller 234 includes a storage device (e.g., one or more hard disks, flash memory modules, solid state disks, and/or optical disks) that contains or stores predefined information (e.g., a predefined security certificate), which may be placed or embedded into the network device during a manufacturing process. In some embodiments, the controller 234 is implemented using at least one processor (e.g., a microcontroller, a DSP, and/or a CPU). In some embodiments, the controller 234 executes one or more Layer 3 or L3 (i.e., the network layer, which is the third level (Layer 3) of the Open Systems Interconnection Model (OSI Model)) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. The controller 234 may include a processor (e.g., a microcontroller, a DSP, and/or a CPU) configured to execute one or more Layer 3 (L3) protocols, and memory that may store information (e.g., an operation system (OS)) for the processor. In some embodiments, the controller 234 is configured to probe for SLA information relevant to the network device 204. For example, the controller 234 may be configured to probe for network availability information, network coverage information, and/or network capacity information relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. In some embodiments, the network device 204 is a wired communications device that includes at least one wired transceiver (e.g., the transceiver 232) and at least one network port (e.g., the network port 238) that is used to connect to another communication device through at least one cable or wire, for example, at least one Ethernet cable. In some embodiments, as a wired device, the network device 204 includes a wireless transceiver and at least one antenna (e.g., the antenna 236).

In the embodiment depicted in FIG. 2, the network device 204 (e.g., the controller 234) includes a network engine 270 configured to execute one or more communications protocols. In some embodiments, the network engine 470 is configured to execute Layer 3 (L3) protocols, for example, an Internal Gateway Protocol (IGP) (e.g., an Open Shortest Path First (OSPF) protocol), a Border Gateway Protocol (BGP), or an Intermediate System to Intermediate System (IS-IS) protocol. In some embodiments, the network engine 270 includes or is implemented using a processor (e.g., a microcontroller, a DSP, and/or a CPU) configured to execute one or more communications protocols (e.g., Layer 3 (L3) protocols), and memory that may store information (e.g., an OS) for the processor. For example, the controller 234 is implemented using a processor and memory, and the network engine 270 is a software module that executes in the processor. In some embodiments, the controller 234 (e.g., the network engine 270) includes a storage device (e.g., one or more hard disks, flash memory modules, solid state disks, and/or optical disks) that contains or stores predefined information (e.g., a predefined security certificate), which may be placed or embedded into the network device 204 during a manufacturing process.

Figure 3:
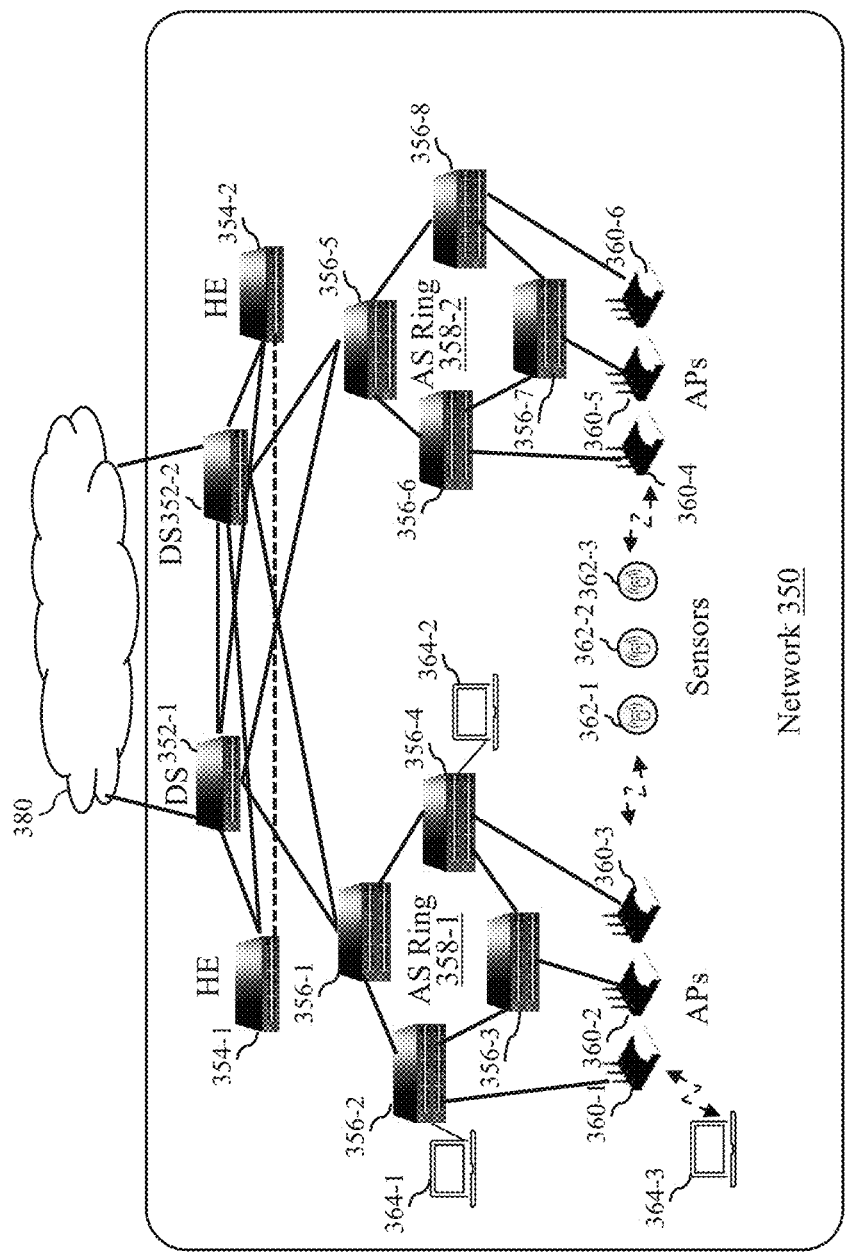
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the network 150 depicted in FIG. 1. However, the network 150 depicted in FIG. 1 is not limited to the embodiment depicted in FIG. 3. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3, 356-4, 356-5, 356-6, 356-7, 356-8 connected in rings 358-1, 358-2 that directly interact with lower level devices (e.g., wireless APs), a number of wireless APs 360-1, 360-2, 360-3, 360-4, 360-5, 360-6 connected to the ASs, a number of wireless sensors 362-1, 362-2, 362-3 that wirelessly connect to the wireless APs, and a number of network devices 364-1, 364-2, 364-3 that are connected to the ASs 356-2, 356-4, and the wireless AP 360-1 through cables or wires, for example, Ethernet cables. The DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, the wireless sensors 362-1, 362-2, 362-3, and/or the network devices 364-1, 364-2, 364-3 may be an embodiment of the network device 204 depicted in FIG. 2. The network devices 364-1, 364-2, 364-3 may be wired and/or wireless devices, for example, laptops, desktop PCs, or other wired devices. In some embodiments, each of the network devices 364-1, 364-2, 364-3 includes at least one wired transceiver (e.g., the transceiver 232) and at least one network port (e.g., the network port 238) that is used to connect to another communication device through at least one cable or wire, for example, at least one Ethernet cable. In some embodiments, as a wired device, each of the network devices 364-1, 364-2, 364-3 includes a wireless transceiver and at least one antenna (e.g., the antenna 236). In some embodiments, the network 350 also includes at least one wired communications device that is connected to the DS 352-1 or 352-2 through at least one cable or wire, for example, at least one Ethernet cable. In the embodiment depicted in FIG. 3, the DSs 352-1, 352-2 are connected to a network 380 (e.g., the Internet), which is connected to a network management module (e.g., the SLA module 110 of the cloud server 102 depicted in FIG. 1). In some embodiments, the DSs 352-1, 352-2, the HEs 354-1, 354-2, and the ASs 356-1, 356-2, 356-3, 356-4, 356-5, 356-6, 356-7, 356-8 constitute a network service block (NSB), which is a basic building block for providing connectivity as a service and is a replicable block that can be scaled (e.g., expanded) to meet any deployment. In some embodiments, the NSB works in Layer 3 or L3 (i.e., the network layer, which is the third level (Layer 3) of the OSI Model) environment and is connected to other wired devices under L3 mode. A wired communications device of a customer (e.g., the network device 364-1, 364-2, or 364-3) can connect to the NSB on an L3 interface in a secured manner. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than eight ASs, more than eight ASs, less than six wireless APs, more than six wireless APs, less than three wireless sensors, more than three wireless sensors, more than three network devices, and/or less than three network devices. Although each of the rings 358-1, 358-2 includes four ASs in the embodiment depicted in FIG. 3, in other embodiments, the number of ASs in each of the rings 358-1, 358-2 may be more than four or less than four. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the ASs, and the sensor(s) in the network 350 varies.

In some embodiments, at least one of the wireless APs 360-1, 360-2, 360-3, 360-4, 360-5, 360-6 is configured to measure and monitor SLA information of the network 350. For example, at least one of the wireless APs 360-1, 360-2, 360-3, 360-4, 360-5, 360-6 is configured to measure and monitor wireless connection availability, wireless network coverage, and/or wireless network capacity of the network 350 at the customer site 114. In some embodiments, a wireless AP 360-1, 360-2, 360-3, 360-4, 360-5, or 360-6 includes multiple radio interfaces or transceivers and one of the radio interfaces or transceivers is used to measure and monitor SLA information at the customer site 114. In some embodiments (e.g., when a network is deployed), if/when a specific wireless AP (e.g., when a wireless sensor of the wireless AP comes online) does not hear (e.g., detect or receive) any signal from neighbor wireless AP(s) or the signal strength of every signal from neighbor wireless AP(s) heard or detected by the specific wireless AP is below a predefined threshold, the cloud server 102 (e.g., the SLA module 110 in the cloud server 102) determines that the specific wireless AP is not capable of measuring and monitoring SLA information of the network 350. For example, when a wireless sensor of a wireless AP comes online, the wireless sensor validates if it detects any signal or message (e.g., a beacon signal or message) from any neighbor AP. If the wireless sensor detects a signal or message (e.g., a beacon signal or message) from a neighbor AP, the wireless sensor starts to monitor the environment. If in the future, the wireless sensor cannot detect any signals or messages (e.g., beacon signals or messages) from any neighbors, SLA service in the cloud (e.g., the cloud server 102) marks the wireless sensor as a violation. In these embodiments, the cloud server 102 (e.g., the SLA module 110 in the cloud server 102) controls the specific wireless AP to stop measure and monitor SLA information. For example, the cloud server 102 (e.g., the SLA module 110 in the cloud server 102) disables SLA scanning and probing of the radio interface or transceiver of the specific wireless AP that is used to measure and monitor SLA information, for example, by sending a disablement signal to the specific wireless AP to disable SLA scanning and probing. Consequently, the computing capacity of the specific wireless AP is preserved, and power consumption of the specific wireless AP is reduced.

Figure 4:
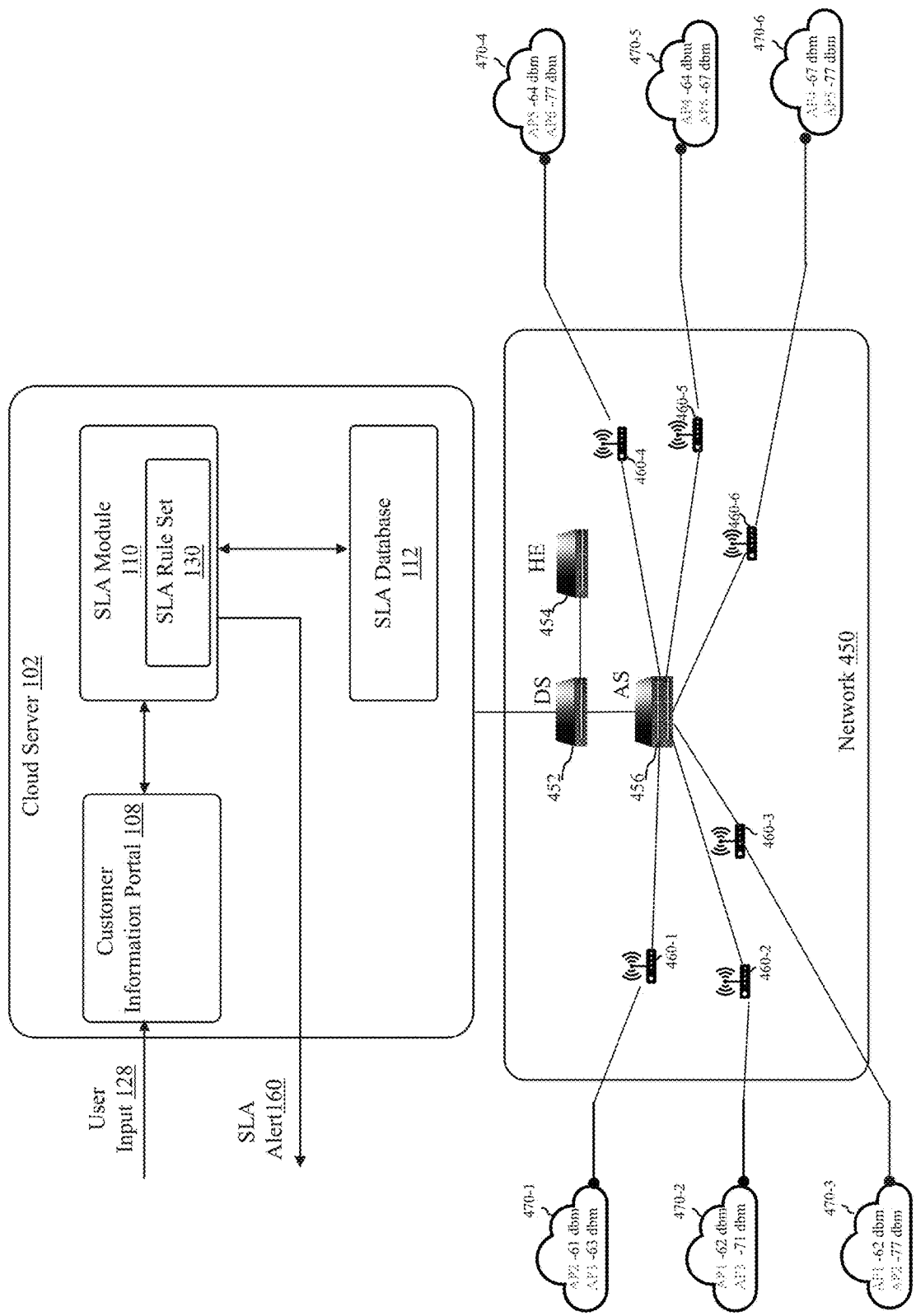
FIG. 4 depicts a network that includes multiple wireless APs whose $3^{rd}$ radios can act as dedicated 24×7 sensors to measure and monitor SLA information of the network and to interact with a cloud server depicted in FIG. 1 for SLA management.

FIG. 4 depicts a network 450 that includes multiple wireless APs 460-1, 460-2, 460-3, 460-4, 460-5, 460-6 whose $3^{rd}$ radios can act as dedicated 24×7 sensors to measure and monitor SLA information of the network 450 and to interact with the cloud server 102 depicted in FIG. 1 for SLA management. The network 450 depicted in FIG. 4 is an embodiment of the network 350 depicted in FIG. 3. However, the network 350 depicted in FIG. 3 is not limited to the embodiment depicted in FIG. 4. In the embodiment depicted in FIG. 4, the network 450 includes the wireless APs 460-1, 460-2, 460-3, 460-4, 460-5, 460-6, at least one distribution switch (DS) or distribution layer switch 452 that is an aggregation switch functioning as a bridge between a core layer switch and an access layer switch, at least one head end (HE) or gateway 454, and at least one access switch (AS) 456 that directly interacts with lower level devices (e.g., wireless APs). The wireless APs 460-1, 460-2, 460-3, 460-4, 460-5, 460-6 depicted in FIG. 4 may be similar to or the same as the wireless APs 360-1, 360-2, 360-3, 360-4, 360-5, 360-6 depicted in FIG. 3. The DS 452 depicted in FIG. 4 may be similar to or the same as the DSs 352-1, 352-2 depicted in FIG. 3. The HE 454 depicted in FIG. 4 may be similar to or the same as the HEs 354-1, 354-2 depicted in FIG. 3. The AS 456 depicted in FIG. 4 may be similar to or the same as the ASs 356-1, 356-2, 356-3, 356-4, 356-5, 356-6, 356-7, 356-8 depicted in FIG. 3. Although the network 450 is shown in FIG. 4 with certain components and described with certain functionality herein, other embodiments of the network 450 may include fewer or more components to implement the same, less, or more functionality. For example, in some embodiments, the network 450 includes more than one DS, no HE, more than one HE, more than one AS, more than six wireless APs, less than six wireless APs, one or more wireless sensors, and/or one or more network devices.

In the embodiment depicted in FIG. 4, the wireless APs 460-1, 460-2, 460-3, 460-4, 460-5, 460-6 are configured to probe for network SLA information of the network 450. In some embodiments, each of the wireless APs 460-1, 460-2, 460-3, 460-4, 460-5, 460-6 scans airwaves to probe for information of respective one or more beaconing wireless APs to generate a signal strength report of neighboring wireless APs and to transmit the signal strength report to the cloud server 102 (e.g., the SLA module 110 in the cloud server 102). In some embodiments, the cloud server 102 (e.g., the SLA module 110 in the cloud server 102) analyzes data (e.g., signal strength reports) from the wireless APs 460-1, 460-2, 460-3, 460-4, 460-5, 460-6 to perform a management operation to the wireless APs 460-1, 460-2, 460-3, 460-4, 460-5, 460-6. For example, the cloud server 102 (e.g., the SLA module 110 in the cloud server 102) analyzes data (e.g., signal strength reports) from the wireless APs 460-1, 460-2, 460-3, 460-4, 460-5, 460-6 to determine whether or not a specific wireless AP is not capable of measuring and monitoring SLA information of the network 450 if the specific wireless AP does not hear (e.g., detect or receive) any signal from neighbor wireless AP(s) or the signal strength of every signal from neighbor wireless AP(s) heard or detected by the specific wireless AP is below a predefined threshold. In these embodiments, the cloud server 102 (e.g., the SLA module 110 in the cloud server 102) controls the specific wireless AP to stop measure and monitor SLA information. For example, the cloud server 102 (e.g., the SLA module 110 in the cloud server 102) disables SLA scanning and probing of the radio interface or transceiver of the specific wireless AP that is used to measure and monitor SLA information, for example, by sending a disablement signal to the specific wireless AP to disable SLA scanning and probing. Consequently, the computing capacity of the specific wireless AP is preserved, and power consumption of the specific wireless AP is reduced. In some embodiments, the cloud server 102 (e.g., the SLA module 110 in the cloud server 102) analyzes data (e.g., signal strength reports) from the wireless APs 460-1, 460-2, 460-3, 460-4, 460-5, 460-6 on a particular floor to verify if the committed number of wireless APs are heard or detected on that floor (e.g., beacon signals of the committed number of wireless APs are received or detected by the wireless APs 460-1, 460-2, 460-3, 460-4, 460-5, 460-6).

In some embodiments, the cloud server 102 (e.g., the SLA module 110 in the cloud server 102) includes memory and one or more processors configured to receive wireless signal strength information that are detected by wireless sensors of wireless APs 460-1, 460-2, 460-3, 460-4, 460-5, 460-6 of the network 450 deployed at the customer site 114 and automatically disable SLA scanning and probing of a first wireless sensor of a first wireless AP of the wireless APs when the wireless signal strength information indicates that wireless signal strength of each neighbor wireless AP of the first wireless AP is below a predefined threshold. For example, when the first wireless AP is far away from and/or obstructed from neighbor wireless AP(s), wireless signal strength of each neighbor wireless AP of the first wireless AP is below the predefined threshold. When the first wireless AP does not detect or receive any signal from neighbor wireless AP(s), wireless signal strength of each neighbor wireless AP of the first wireless AP, which is zero, is below the predefined threshold. In some embodiments, the one or more processors are further configured to automatically determine or calculate an SLA metric based on the wireless signal strength information that are detected by the wireless sensors of the wireless APs except signal strength information detected by the first wireless sensor of the first wireless AP. In some embodiments, the first wireless AP further includes two wireless radio frequency (RF) frontends having two different frequencies. In some embodiments, the two wireless RF frontends are of 2.4 gigahertz and 5 gigahertz. In some embodiments, the one or more processors are further configured to automatically enable SLA scanning and probing of the first wireless sensor of the first wireless AP of the wireless APs after SLA scanning and probing of the first wireless sensor is disabled. In some embodiments, the wireless signal strength information that are detected by the wireless sensors of the wireless APs includes signal strength reports that are generated by the wireless APs. In some embodiments, each of the signal strength reports that are generated by the wireless APs comprises a neighbor wireless AP and a wireless signal strength value of the neighbor wireless AP. In some embodiments, the cloud server is connected to the wireless APs through a distribution switch (DS) and an access switch (AS). In some embodiments, the one or more processors are further configured to generate an alert regarding the network deployed at the customer site when the SLA metric does not satisfy a predetermined SLA threshold. In some embodiments, the SLA metric includes a percentage of time in which a predetermined network availability, coverage, or capacity is satisfied in a time unit, and the one or more processors are further configured to generate the alert regarding the network deployed at the customer site when the percentage of time in which the predetermined network availability, coverage, or capacity is satisfied in the time unit is lower than the predetermined SLA threshold.

In an example SLA operation of the network 450 depicted in FIG. 4, the wireless APs 460-1, 460-2, 460-3, 460-4, 460-5, 460-6 can be enabled or disabled to conduct probe and scanning tests for SLA calculation or to stop conducting probe and scanning tests for SLA calculation to preserve computing and/or power resources without any human intervention. Initially, after the network 450 is deployed, all of the wireless APs 460-1, 460-2, 460-3, 460-4, 460-5, 460-6 boot up. Subsequently, radio sensors of the wireless APs 460-1, 460-2, 460-3, 460-4, 460-5, 460-6 scan the wireless communications channel to generate or produce neighborhood AP signal strength reports and sends the neighborhood AP signal strength reports to the cloud server 102 (e.g., the SLA module 110 in the cloud server 102). The cloud server 102 (e.g., the SLA module 110 in the cloud server 102) examines the neighborhood AP signal strength reports to identify if the radio sensor of the wireless AP 460-1, 460-2, 460-3, 460-4, 460-5, or 460-6 can see at least one wireless AP with a signal strength above a predetermined signal strength (e.g., −65 dbm or other value) or better. If/when the radio sensor of a specific wireless AP 460-1, 460-2, 460-3, 460-4, 460-5, or 460-6 cannot see a single wireless AP above the predetermined signal strength (e.g., −65 dbm or other value) or better, the cloud server 102 (e.g., the SLA module 110 in the cloud server 102) disables the probe and scan tests on that particular radio sensor of the specific wireless AP 460-1, 460-2, 460-3, 460-4, 460-5, or 460-6 (e.g., by sending a disablement signal to a specific wireless AP) and excludes information (e.g., signal strength report) from the specific wireless AP 460-1, 460-2, 460-3, 460-4, 460-5, or 460-6 from any SLA calculation. Consequently, the cloud server 102 (e.g., the SLA module 110 in the cloud server 102) can provide accurate wireless SLA (e.g., availability, coverage, and capacity) of the network 450. For example, the wireless AP 460-1 scans the wireless communications channel to probe for information of respective one or more beaconing APs and generates a signal strength report 470-1, which contains AP2, AP3 (corresponding to the wireless APs 460-2, 460-3) and signal strengths of −61 dbm, −63 dbm, of wireless signals received from the wireless APs 460-2, 460-3, and transmits the signal strength report 470-1 to the cloud server 102 (e.g., the SLA module 110 in the cloud server 102). The wireless AP 460-2 scans the wireless communications channel to probe for information of respective one or more beaconing APs and generates a signal strength report 470-2, which contains AP1, AP3 (corresponding to the wireless APs 460-1, 460-3) and signal strengths of −62 dbm, −71 dbm, of wireless signals received from the wireless APs 460-1, 460-3, and transmits the signal strength report 470-2 to the cloud server 102 (e.g., the SLA module 110 in the cloud server 102). The wireless AP 460-3 scans the wireless communications channel to probe for information of respective one or more beaconing APs and generates a signal strength report 470-3, which contains AP1, AP2 (corresponding to the wireless APs 460-1, 460-2) and signal strengths of −62 dbm, −77 dbm, of wireless signals received from the wireless APs 460-1, 460-2, and transmits the signal strength report 470-3 to the cloud server 102 (e.g., the SLA module 110 in the cloud server 102). The wireless AP 460-4 scans the wireless communications channel to probe for information of respective one or more beaconing APs and generates a signal strength report 470-4, which contains AP5, AP6 (corresponding to the wireless APs 460-5, 460-6) and signal strengths of −64 dbm, −77 dbm, of wireless signals received from the wireless APs 460-5, 460-6, and transmits the signal strength report 470-4 to the cloud server 102 (e.g., the SLA module 110 in the cloud server 102). The wireless AP 460-5 scans the wireless communications channel to probe for information of respective one or more beaconing APs and generates a signal strength report 470-5, which contains AP4, AP6 (corresponding to the wireless APs 460-4, 460-6) and signal strengths of −64 dbm, −67 dbm, of wireless signals received from the wireless APs 460-4, 460-6, and transmits the signal strength report 470-5 to the cloud server 102 (e.g., the SLA module 110 in the cloud server 102). The wireless AP 460-6 scans the wireless communications channel to probe for information of respective one or more beaconing APs and generates a signal strength report 470-6, which contains AP4, AP5 (corresponding to the wireless APs 460-4, 460-5) and signal strengths of −67 dbm, −77 dbm, of wireless signals received from the wireless APs 460-4, 460-5, and transmits the signal strength report 470-6 to the cloud server 102 (e.g., the SLA module 110 in the cloud server 102). The cloud server 102 (e.g., the SLA module 110 in the cloud server 102) analyzes the signal strength reports 470-1, 470-2, 470-3, 470-4, 470-5, 470-6 from the wireless APs 460-1, 460-2, 460-3, 460-4, 460-5, 460-6 to determine whether or not a specific wireless AP is not capable of measuring and monitoring SLA information of the network 450. For example, if a specific wireless AP does not hear (e.g., detect or receive) any signal from neighbor wireless AP(s) or the signal strength of every signal from neighbor wireless AP(s) heard (e.g., detected) by the specific wireless AP is below a threshold (e.g., −65 dbm), the cloud server 102 (e.g., the SLA module 110 in the cloud server 102) controls the specific wireless AP to stop measure and monitor SLA information. The signal strength threshold is not limited examples described (e.g., −65 dbm). For example, the signal strength threshold may be −67 dbm or other suitable value.

For the wireless AP 460-1, the signal strength report 470-1 indicates that signal strengths of −61 dbm, −63 dbm, of wireless signals are received from the wireless APs 460-2, 460-3. Because signal strengths (−61 dbm, −63 dbm) of wireless signals received from the wireless APs 460-2, 460-3 are both higher than −65 dbm, the cloud server 102 (e.g., the SLA module 110 in the cloud server 102) determines that the wireless AP 460-1 is capable of measuring and monitoring SLA information and that no SLA measuring and monitoring disablement is needed for the wireless AP 460-1.

For the wireless AP 460-2, the signal strength report 470-2 indicates that signal strengths of −62 dbm, −71 dbm, of wireless signals are received from the wireless APs 460-1, 460-3. Because at least one of the signal strengths (−62 dbm, −71 dbm) of wireless signals received from the wireless APs 460-1, 460-3 is higher than −65 dbm, the cloud server 102 (e.g., the SLA module 110 in the cloud server 102) determines that the wireless AP 460-2 is capable of measuring and monitoring SLA information and that no SLA measuring and monitoring disablement is needed for the wireless AP 460-2.

For the wireless AP 460-3, the signal strength report 470-3 indicates that signal strengths of −62 dbm, −77 dbm, of wireless signals are received from the wireless APs 460-1, 460-2. Because at least one of the signal strengths (−62 dbm, −77 dbm) of wireless signals received from the wireless APs 460-1, 460-2 is higher than −65 dbm, the cloud server 102 (e.g., the SLA module 110 in the cloud server 102) determines that the wireless AP 460-3 is capable of measuring and monitoring SLA information and that no SLA measuring and monitoring disablement is needed for the wireless AP 460-3.

For the wireless AP 460-4, the signal strength report 470-4 indicates that signal strengths of −64 dbm, −77 dbm, of wireless signals are received from the wireless APs 460-5, 460-6. Because at least one of the signal strengths (−64 dbm, −77 dbm) of wireless signals received from the wireless APs 460-5, 460-6 is higher than −65 dbm, the cloud server 102 (e.g., the SLA module 110 in the cloud server 102) determines that the wireless AP 460-4 is capable of measuring and monitoring SLA information and that no SLA measuring and monitoring disablement is needed for the wireless AP 460-4.

For the wireless AP 460-5, the signal strength report 470-5 indicates that signal strengths of −64 dbm, −67 dbm, of wireless signals are received from the wireless APs 460-4, 460-6. Because at least one of the signal strengths (−64 dbm, −67 dbm) of wireless signals received from the wireless APs 460-4, 460-6 is higher than −65 dbm, the cloud server 102 (e.g., the SLA module 110 in the cloud server 102) determines that the wireless AP 460-5 is capable of measuring and monitoring SLA information and that no SLA measuring and monitoring disablement is needed for the wireless AP 460-5.

For the wireless AP 460-6, the signal strength report 470-6 indicates that signal strengths of −67 dbm, −77 dbm, of wireless signals are received from the wireless APs 460-4, 460-5. Because the signal strengths (−67 dbm, −77 dbm) of wireless signals received from the wireless APs 460-4, 460-5 are both lower than −65 dbm, the cloud server 102 (e.g., the SLA module 110 in the cloud server 102) determines that the wireless AP 460-6 is not capable of measuring and monitoring SLA information and that SLA measuring and monitoring disablement is needed for the wireless AP 460-6. For example, the cloud server 102 (e.g., the SLA module 110 in the cloud server 102) disables SLA scanning and probing of the radio interface or transceiver of the wireless AP 460-6 is that is used to measure and monitor SLA information without human intervention, for example, by sending a disablement signal to the wireless AP 460-6 through the DS 452 and the AS 456 to disable SLA scanning and probing. Consequently, the computing capacity of the wireless AP 460-6 is preserved, and power consumption of the specific wireless AP is reduced. The cloud server 102 (e.g., the SLA module 110 in the cloud server 102) can re-enable SLA scanning and probing of the radio interface or transceiver of the wireless AP 460-6 to measure and monitor SLA information without human intervention. In some embodiments, the cloud server 102 (e.g., the SLA module 110 in the cloud server 102) automatically determines or calculates an SLA metric based on the wireless signal strength information that are detected by the wireless sensors of the wireless APs except signal strength information detected by the first wireless sensor of the first wireless AP. In some embodiments, the SLA metric includes a percentage of time in which a predetermined network availability, coverage, or capacity is satisfied in a time unit, and the cloud server 102 (e.g., the SLA module 110 in the cloud server 102) generates an alert regarding the network 450 when the percentage of time in which the predetermined network availability, coverage, or capacity is satisfied in the time unit is lower than the predetermined SLA threshold.

Figure 5:
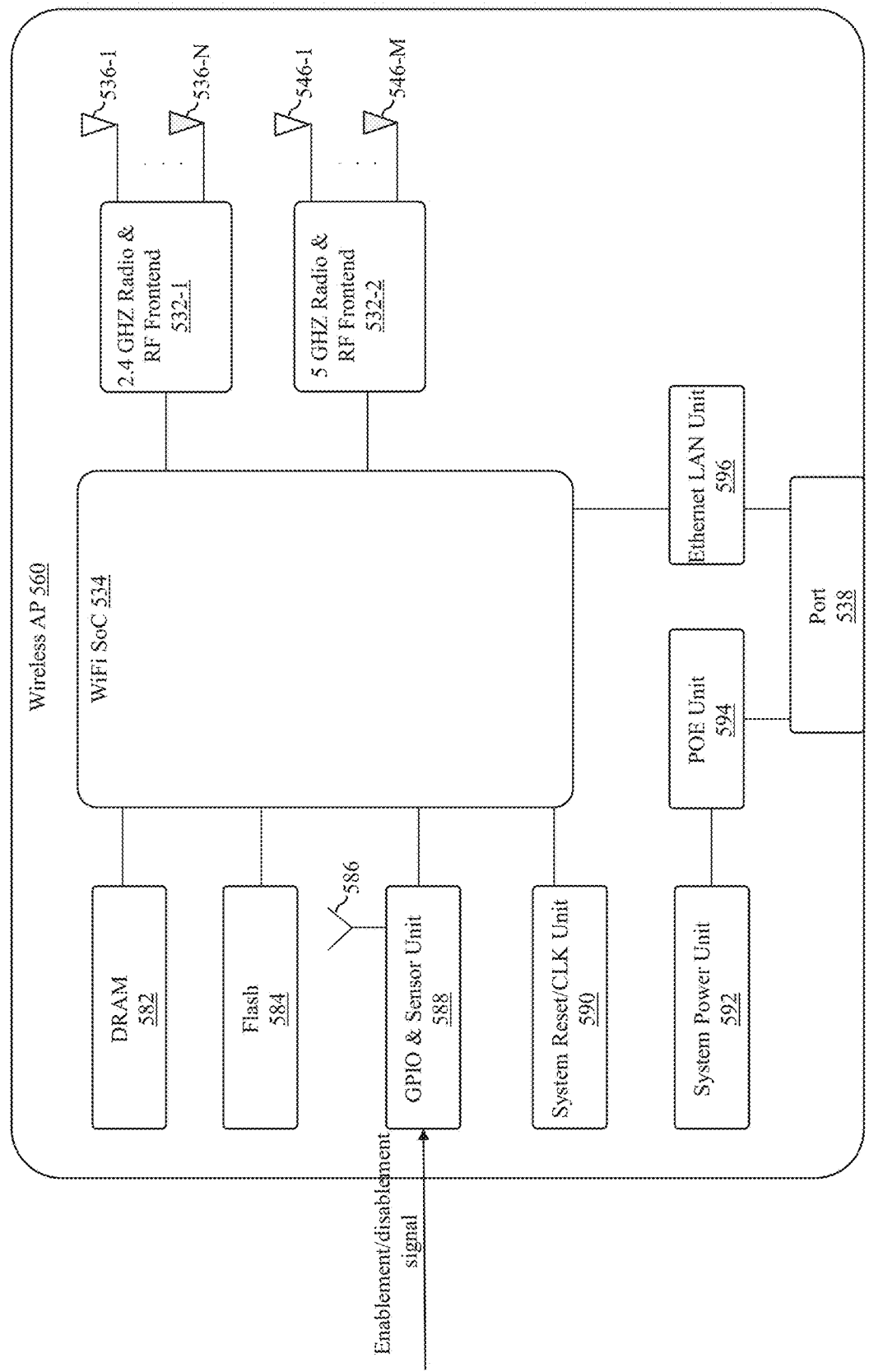
FIG. 5 depicts an embodiment of a wireless AP that can be included in the network depicted in FIG. 4.

FIG. 5 depicts an embodiment of a wireless AP 560 that can be included in the network 450 depicted in FIG. 4. The wireless AP 560 is an embodiment of the wireless APs 460-1, 460-2, 460-3, 460-4, 460-5, 460-6 of the network 450 depicted in FIG. 4. However, the wireless APs 460-1, 460-2, 460-3, 460-4, 460-5, 460-6 of the network 450 depicted in FIG. 4 are not limited to the embodiment depicted in FIG. 5. In the embodiment depicted in FIG. 5, the wireless AP 560 includes a WiFi system-on-chip (SoC) 534 that may be an application-specific integrated circuit (ASIC), a 2.4 GHz radio & radio frequency (RF) frontend 532-1 with an antenna array of antennas 536-1, ..., 536-N (N is a positive integer), a 5 GHz radio & RF frontend 532-2 with an antenna array of antennas 546-1, ..., 546-M (M is a positive integer), a network port 538 that can be connected to a switch (e.g., an AS or an DS) or a router, a Dynamic random-access memory (DRAM) 582, flash 584, a general-purpose input/output (GPIO) & sensor unit 588 with at least one antenna 586, a system reset/clock (CLK) unit 590, a system power unit 592, an optional Power over Ethernet (PoE) unit 594, and an Ethernet LAN unit 596. Although the wireless AP 560 is shown in FIG. 5 with certain components and described with certain functionality herein, other embodiments of the wireless AP 560 may include fewer or more components to implement the same, less, or more functionality. For example, in some embodiments, the wireless AP 560 includes no DRAM, no flash, no POE unit, and/or multiple network ports.

In the embodiment depicted in FIG. 5, the WiFi system-on-chip (SoC) 534 is configured to control the 2.4 GHz radio & RF frontend 532-1 and the antenna array of antennas 536-1, ..., 536-N, the 5 GHz radio & RF frontend 532-2 with the antenna array of antennas 546-1, ..., 546-M, the network port 538, the DRAM 582, the flash 584, the GPIO & sensor unit 588 with the antenna 586, the system reset/ CLK unit 590, the system power unit 592, the PoE unit 594, and the Ethernet LAN unit 596. The network port 538 may be any suitable type of port. For example, the network port may be LAN network ports such as Ethernet ports. However, the network port is not limited to LAN network ports.

In the embodiment depicted in FIG. 5, the GPIO & sensor unit 588 is configured to measure and monitor SLA information (e.g., signal strength information) using the at least one antenna 586. The GPIO & sensor unit 588 can conduct probe and scanning tests. The data generated from these tests can be used for measuring the network availability, coverage, and/or capacity of the network 450. For example, the GPIO & sensor unit 588 can measure and monitor signal strength of one or more neighboring wireless APs. The SLA scanning and probing of the GPIO & sensor unit 588 can be automatically enabled or disabled (e.g., based on an enablement or disablement signal received at a general-purpose input/output (GPIO) port) to conduct probe and scanning tests for SLA calculation or to stop conducting probe and scanning tests for SLA calculation to preserve computing and/or power resources of the wireless AP 560. In some deployments (e.g., classrooms), the GPIO & sensor unit 588 may not see any neighbor wireless AP due to obstacles (e.g., concreted walls), and the signal strength detected by the GPIO & sensor unit 588 is below a certain threshold. In such scenarios, the GPIO & sensor unit 588 is automatically turned off by the cloud server 102 (e.g., the SLA module 110 in the cloud server 102) without any human intervention and does not conduct any tests. Subsequently, SLA scanning and probing of the GPIO & sensor unit 588 can be automatically enabled to resume conducting probe and scanning tests for SLA calculation.

In the embodiment depicted in FIG. 5, the system reset/ CLK unit 590 is configured to perform system reset and/or provide a system clock signal to the wireless AP 560. In some embodiments, the system reset/CLK unit 590 includes a clock generator or a signal oscillator. In the embodiment depicted in FIG. 5, the system power unit 592 is configured to provide power to the wireless AP 560. In some embodiments, the system power unit 592 includes a power adapter or a battery. In the embodiment depicted in FIG. 5, the PoE unit 594 is configured to perform Power over Ethernet functions. In the embodiment depicted in FIG. 5, the Ethernet LAN unit 596 is configured to perform Ethernet communications functions. In some embodiments, the Ethernet LAN unit 596 includes an Ethernet transceiver.

Figure 6:
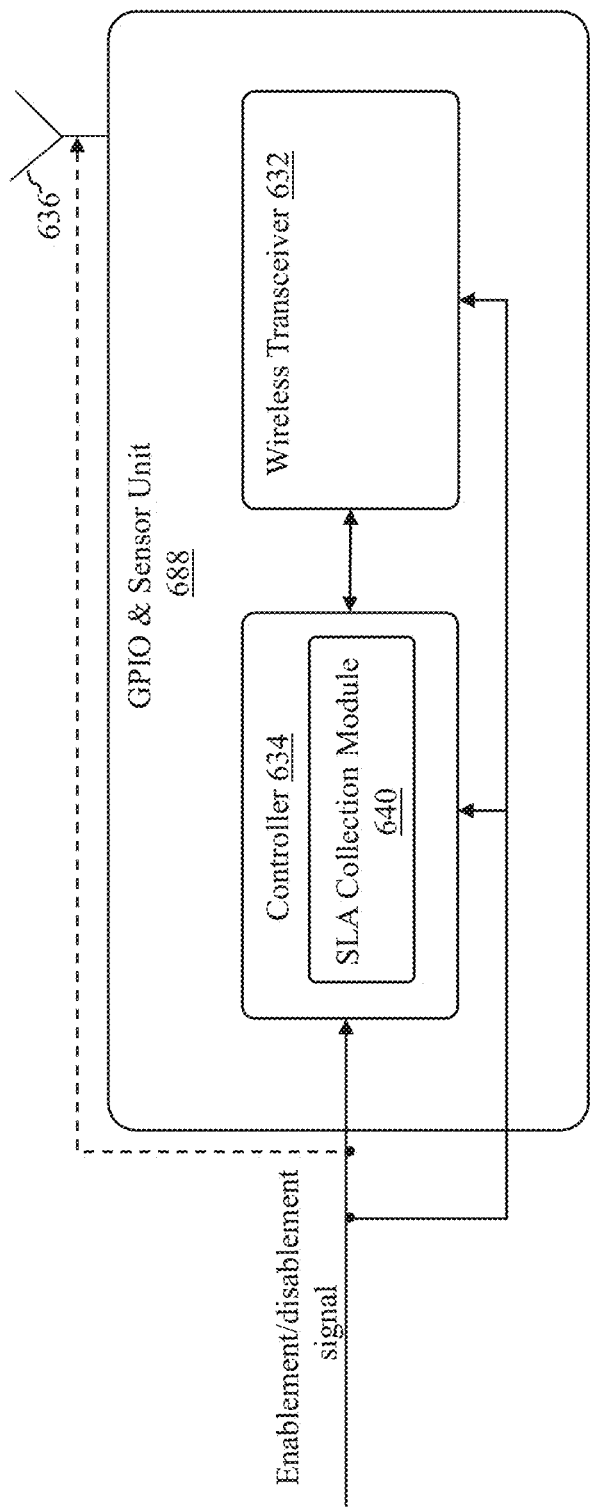
FIG. 6 depicts an embodiment of a general-purpose input/output (GPIO) & sensor unit that can be included in the wireless AP depicted in FIG. 5.

FIG. 6 depicts an embodiment of a GPIO & sensor unit 688 that can be included in the wireless AP 560 depicted in FIG. 5. The GPIO & sensor unit 688 is an embodiment of the GPIO & sensor unit 588 of the wireless AP 560 depicted in FIG. 4. However, the GPIO & sensor unit 588 of the wireless AP 560 depicted in FIG. 5 are not limited to the embodiment depicted in FIG. 6. In the embodiment depicted in FIG. 6, the GPIO & sensor unit 688 includes a wireless transceiver 632, a controller 634 operably connected to the wireless transceiver 632, and at least one antenna 636 operably connected to the wireless transceiver 632. The controller 634 may include a processor (e.g., a microcontroller, a DSP, and/or a CPU) configured to execute one or more communications protocols, and memory that may store information (e.g., an OS) for the processor. The wireless transceiver 632 may be any suitable type of transceiver. For example, the wireless transceiver 632 may be a WLAN transceiver (e.g., a transceiver compatible with an IEEE 802.11 protocol). In some embodiments, the GPIO & sensor unit 688 includes multiple wireless transceivers, for example, a short-range communications transceiver (e.g., a Bluetooth) and a WLAN transceiver (e.g., a transceiver compatible with an IEEE 802.11 protocol). In some embodiments, the controller 634 is configured to control the wireless transceiver 632 to process packets received through the antenna 636 and/or to generate outgoing packets to be transmitted through the antenna 636. In some embodiments, the controller 634 is configured to probe for SLA information relevant to the wireless AP 560. For example, the controller 634 may be configured to probe for network availability information, network coverage information, and/or network capacity information relevant to the wireless AP 560. In some embodiments, the controller 634 includes an SLA collection module 640 configured to measure and monitor SLA information relevant to the wireless AP 560. In some embodiments, the SLA collection module 640 is configured to measure and monitor wireless connection availability, wireless network coverage, and/or wireless network capacity at the customer site 114, for example, wireless connection availability, wireless network coverage, and/or wireless network capacity of the network 450. The SLA collection module 640 may be implemented in hardware (e.g., circuits), software, firmware, or a combination thereof. For example, the controller 234 is implemented using a processor and memory, and the SLA collection module 640 is a software module that executes in the processor. The antenna 636 may be any suitable type of antenna. For example, the antenna 636 may be an induction type antenna such as a loop antenna or any other suitable type of induction type antenna. However, the antenna 636 is not limited to an induction type antenna.

In an example operation of the GPIO & sensor unit 588 depicted in FIG. 5, the SLA scanning and probing of the GPIO & sensor unit 588 can be enabled or disabled by the cloud server 102 (e.g., the SLA module 110 in the cloud server 102) to conduct probe and scanning tests for SLA calculation or to stop conducting probe and scanning tests for SLA calculation to preserve computing and/or power resources without any human intervention. Initially, the GPIO & sensor unit 588 boots up. Subsequently, the GPIO & sensor unit 588 scans the wirelessly communications channel to generate or produce neighborhood AP signal strength reports and sends the neighborhood AP signal strength reports to the cloud server 102 (e.g., the SLA module 110 in the cloud server 102). The cloud server 102 (e.g., the SLA module 110 in the cloud server 102) examines the neighborhood AP signal strength reports to identify if the GPIO & sensor unit 588 can see at least one wireless AP with a signal strength above a predetermined signal strength (e.g., −65 dbm or other value) or better. If/when the GPIO & sensor unit 588 cannot see a single wireless AP above the predetermined signal strength (e.g., −65 dbm or other value) or better, the cloud server 102 (e.g., the SLA module 110 in the cloud server 102) disables the SLA scanning and probing of the GPIO & sensor unit 588, for example, by sending a disablement signal to the GPIO & sensor unit 588 and excludes information (e.g., signal strength report) from a specific wireless AP that includes the GPIO & sensor unit 588 from any SLA calculation. For example, the cloud server 102 (e.g., the SLA module 110 in the cloud server 102) can send an enablement/disablement signal to enable or disable the SLA scanning and probing of the GPIO & sensor unit 588. The cloud server 102 (e.g., the SLA module 110 in the cloud server 102) can send an enablement/disablement signal to the wireless transceiver 632, the controller 634, and/or the antenna 636 to enable or disable SLA scanning and probing of the wireless transceiver 632, the controller 634, and/or the antenna 636. In some embodiments, the cloud server 102 (e.g., the SLA module 110 in the cloud server 102) sends a disablement signal the wireless transceiver 632, the controller 634, and/or the antenna 636 to place the wireless transceiver 632, the controller 634, and/or the antenna 636 into a standby mode or a low-power mode or sends an enablement signal the wireless transceiver 632, the controller 634, and/or the antenna 636 to place the wireless transceiver 632, the controller 634, and/or the antenna 636 into a normal operating mode or a full-power mode. Consequently, the cloud server 102 (e.g., the SLA module 110 in the cloud server 102) can provide accurate wireless SLA (e.g., availability, coverage, and/or capacity) of a network.

Figure 7:
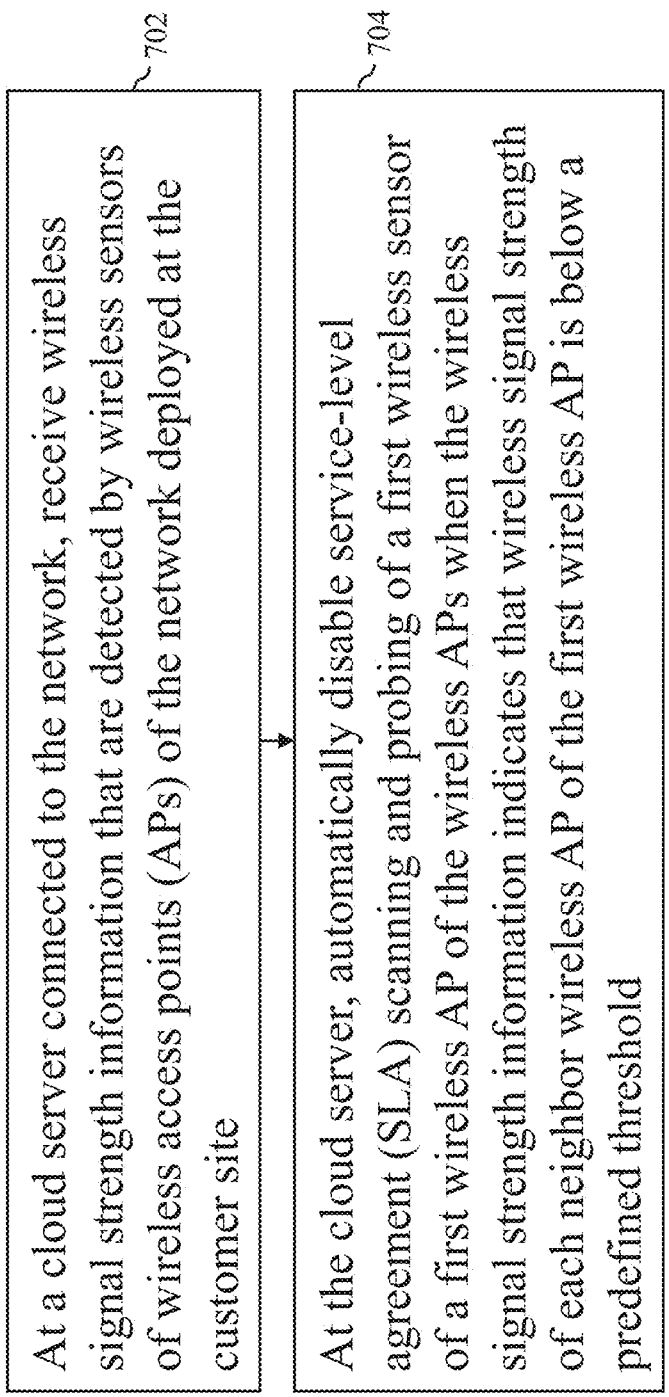
FIG. 7 is a process flow diagram of a method for managing a network deployed at a customer site in accordance to an embodiment of the invention.

FIG. 7 is a process flow diagram of a method for managing a network deployed at a customer site in accordance to an embodiment of the invention. According to the method, at block 702, at a cloud server connected to the network, wireless signal strength information that are detected by wireless sensors of wireless access points (APs) of the network deployed at the customer site is received. At block 704, at the cloud server, SLA scanning and probing of a first wireless sensor of a first wireless AP of the wireless APs is automatically disabled when the wireless signal strength information indicates that wireless signal strength of each neighbor wireless AP of the first wireless AP is below a predefined threshold. For example, when the first wireless AP is far away from and/or obstructed from neighbor wireless AP(s), wireless signal strength of each neighbor wireless AP of the first wireless AP is below the predefined threshold. When the first wireless AP does not detect or receive any signal from neighbor wireless AP(s), wireless signal strength of each neighbor wireless AP of the first wireless AP, which is zero, is below the predefined threshold. In some embodiments, at the cloud server, a service-level agreement (SLA) metric is automatically determined based on the wireless signal strength information that are detected by the wireless sensors of the wireless APs except signal strength information detected by the first wireless sensor of the first wireless AP. In some embodiments, the first wireless AP further includes two wireless radio frequency (RF) frontends having two different frequencies. In some embodiments, the two wireless RF frontends are of 2.4 gigahertz and 5 gigahertz. In some embodiments, at the cloud server, SLA scanning and probing of the first wireless signal sensor of the first wireless AP of the wireless APs is automatically enabled after SLA scanning and probing of the first wireless sensor is disabled, for example, when the cloud server determines to re-consider information gathered by the first wireless AP for SLA calculation. In some embodiments, the wireless signal strength information that are detected by the wireless sensors of the wireless APs includes signal strength reports that are generated by the wireless APs. In some embodiments, each of the signal strength reports that are generated by the wireless APs includes a neighbor wireless AP and a wireless signal strength value of the neighbor wireless AP. In some embodiments, the cloud server is connected to a distribution switch (DS) and an access switch (AS). In some embodiments, at the cloud server, an alert regarding the network deployed at the customer site is generated when the SLA metric does not satisfy a predetermined SLA threshold. In some embodiments, the SLA metric includes a percentage of time in which a predetermined network availability, coverage, or capacity is satisfied in a time unit, and at the cloud server, the alert regarding the network deployed at the customer site is generated when the percentage of time in which the predetermined network availability, coverage, or capacity is satisfied in the time unit is lower than the predetermined SLA threshold. The network may be similar to, the same as, or a component of the network 150 depicted in FIG. 1, the network 350 depicted in FIG. 3, and/or the network 450 depicted in FIG. 4. The wireless APs may be similar to, the same as, or a component of the wireless APs 360-1, 360-2, 360-3, 360-4, 360-5, 360-6 depicted in FIG. 3, the wireless APs 460-1, 460-2, 460-3, 460-4, 460-5, 460-6 depicted in FIG. 4, and/or the wireless AP 560 depicted in FIG. 5. The cloud server may be similar to, the same as, or a component of the cloud server 102 depicted in FIGS. 1 and 4. The distribution switch (DS) and the access switch (AS) may be similar to, the same as, or a component of the DS 452 and the AS 456 depicted in FIG. 4. The two wireless RF frontends may be similar to, the same as, or a component of the 2.4 GHz radio & RF frontend 532-1 and the 5 GHz radio & RF frontend 532-2 depicted in FIG. 5. The first wireless sensor may be similar to, the same as, or a component of the GPIO & sensor unit 588 depicted in FIG. 5 and/or the GPIO & sensor unit 688 depicted in FIG. 6.

FIG. 8 is a process flow diagram of a method for managing a network deployed at a customer site in accordance to an embodiment of the invention. According to the method, at block 802, at a cloud server connected to the network, wireless signal strength information that are detected by wireless sensors of wireless access points (APs) of the network deployed at the customer site is received. At block 804, at the cloud server, SLA scanning and probing of a first wireless sensor of a first wireless AP of the wireless APs is automatically disabled when the wireless signal strength information indicates that wireless signal strength of each neighbor wireless AP of the first wireless AP is below a predefined threshold, where the first wireless AP further comprises two wireless radio frequency (RF) frontends having frequencies of 2.4 gigahertz and 5 gigahertz. For example, when the first wireless AP is far away from and/or obstructed from neighbor wireless AP(s), wireless signal strength of each neighbor wireless AP of the first wireless AP is below the predefined threshold. When the first wireless AP does not detect or receive any signal from neighbor wireless AP(s), wireless signal strength of each neighbor wireless AP of the first wireless AP, which is zero, is below the predefined threshold. At block 806, at the cloud server, a service-level agreement (SLA) metric is automatically determined based on the wireless signal strength information that are detected by the wireless sensors of the wireless APs except signal strength information detected by the first wireless sensor of the first wireless AP. The network may be similar to, the same as, or a component of the network 150 depicted in FIG. 1, the network 350 depicted in FIG. 3, and/or the network 450 depicted in FIG. 4. The wireless APs may be similar to, the same as, or a component of the wireless APs 360-1, 360-2, 360-3, 360-4, 360-5, 360-6 depicted in FIG. 3, the wireless APs 460-1, 460-2, 460-3, 460-4, 460-5, 460-6 depicted in FIG. 4, and/or the wireless AP 560 depicted in FIG. 5. The cloud server may be similar to, the same as, or a component of the cloud server 102 depicted in FIGS. 1 and 4. The two wireless RF frontends may be similar to, the same as, or a component of the 2.4 GHz radio & RF frontend 532-1 and the 5 GHz radio & RF frontend 532-2 depicted in FIG. 5. The first wireless sensor may be similar to, the same as, or a component of the GPIO & sensor unit 588 depicted in FIG. 5 and/or the GPIO & sensor unit 688 depicted in FIG. 6.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for managing a network deployed at a customer site, the method comprising:
   at a cloud server connected to the network, receiving wireless signal strength information that are detected by a plurality of wireless sensors of a plurality of wireless access points (APs) of the network deployed at the customer site; and
   at the cloud server, automatically disabling service-level agreement (SLA) scanning and probing of a first wireless sensor of a first wireless AP of the wireless APs when the wireless signal strength information indicates that wireless signal strength of each neighbor wireless AP of the first wireless AP is below a predefined threshold.

2. The method of claim 1, further comprising at the cloud server, automatically determining an SLA metric based on the wireless signal strength information that are detected by the wireless sensors of the wireless APs except signal strength information detected by the first wireless sensor of the first wireless AP.

3. The method of claim 1, wherein the first wireless AP further comprises two wireless radio frequency (RF) frontends having two different frequencies.

4. The method of claim 3, wherein the two wireless RF frontends are of 2.4 gigahertz and 5 gigahertz.

5. The method of claim 1, further comprising at the cloud server, automatically enabling SLA scanning and probing of the first wireless sensor of the first wireless AP of the wireless APs after SLA scanning and probing of the first wireless sensor is disabled.

6. The method of claim 1, wherein the wireless signal strength information that are detected by the wireless sensors of the wireless APs comprises a plurality of signal strength reports that are generated by the wireless APs.

7. The method of claim 6, wherein each of the signal strength reports that are generated by the wireless APs comprises a neighbor wireless AP and a wireless signal strength value of the neighbor wireless AP.

8. The method of claim 1, wherein the cloud server is connected to the wireless APs through a distribution switch (DS) and an access switch (AS).

9. The method of claim 2, further comprising at the cloud server, generating an alert regarding the network deployed at the customer site when the SLA metric does not satisfy a predetermined SLA threshold.

10. The method of claim 9, wherein the SLA metric comprises a percentage of time in which a predetermined network availability, coverage, or capacity is satisfied in a time unit, and wherein at the cloud server, generating the alert regarding the network deployed at the customer site when the SLA metric does not satisfy the predetermined SLA threshold comprises at the cloud server, generating the alert regarding the network deployed at the customer site when the percentage of time in which the predetermined network availability, coverage, or capacity is satisfied in the time unit is lower than the predetermined SLA threshold.

11. A cloud server for managing a network deployed at a customer site, the cloud server comprising:
memory; and
one or more processors configured to:
receive wireless signal strength information that are detected by a plurality of wireless sensors of a plurality of wireless access points (APs) of the network deployed at the customer site; and
automatically disable service-level agreement (SLA) scanning and probing of a first wireless sensor of a first wireless AP of the wireless APs when the wireless signal strength information indicates that wireless signal strength of each neighbor wireless AP of the first wireless AP is below a predefined threshold.

12. The cloud server of claim 11, wherein the one or more processors are further configured to automatically determine an SLA metric based on the wireless signal strength information that are detected by the wireless sensors of the wireless APs except signal strength information detected by the first wireless sensor of the first wireless AP.

13. The cloud server of claim 11, wherein the first wireless AP further comprises two wireless radio frequency (RF) frontends having two different frequencies.

14. The cloud server of claim 13, wherein the two wireless RF frontends are of 2.4 gigahertz and 5 gigahertz.

15. The cloud server of claim 11, wherein the one or more processors are further configured to automatically enable SLA scanning and probing of the first wireless sensor of the first wireless AP of the wireless APs after SLA scanning and probing of the first wireless sensor is disabled.

16. The cloud server of claim 11, wherein the wireless signal strength information that are detected by the wireless sensors of the wireless APs comprises a plurality of signal strength reports that are generated by the wireless APs.

17. The cloud server of claim 16, wherein each of the signal strength reports that are generated by the wireless APs comprises a neighbor wireless AP and a wireless signal strength value of the neighbor wireless AP.

18. The cloud server of claim 11, wherein the cloud server is connected to the wireless APs through a distribution switch (DS) and an access switch (AS).

19. The cloud server of claim 12, wherein the one or more processors are further configured to generate an alert regarding the network deployed at the customer site when the SLA metric does not satisfy a predetermined SLA threshold.

20. A method for managing a network deployed at a customer site, the method comprising:
at a cloud server connected to the network, receiving wireless signal strength information that are detected by a plurality of wireless sensors of a plurality of wireless access points (APs) of the network deployed at the customer site;
at the cloud server, automatically disabling service-level agreement (SLA) scanning and probing of a first wireless sensor of a first wireless AP of the wireless APs when the wireless signal strength information indicates that wireless signal strength of each neighbor wireless AP of the first wireless AP is below a predefined threshold, wherein the first wireless AP further comprises two wireless radio frequency (RF) frontends having frequencies of 2.4 gigahertz and 5 gigahertz; and
at the cloud server, automatically determining an SLA metric based on the wireless signal strength information that are detected by the wireless sensors of the wireless APs except signal strength information detected by the first wireless sensor of the first wireless AP.

* * * * *